United States Patent [19]

Sample

[11] Patent Number: 4,729,691
[45] Date of Patent: Mar. 8, 1988

[54] BACKSHORE SILL BEACH AND DUNE EROSION CONTROL SYSTEM

[76] Inventor: Jay W. Sample, 7315 S. Indian River Dr., Fort Pierce, Fla. 33482

[21] Appl. No.: 926,663

[22] Filed: Nov. 4, 1986

[51] Int. Cl.⁴ ............................................. E02B 3/06
[52] U.S. Cl. ...................................... 405/21; 405/15
[58] Field of Search .................................. 405/15–19, 405/30–35

[56] References Cited

U.S. PATENT DOCUMENTS

| | | | |
|---|---|---|---|
| 752,781 | 2/1904 | Kerr | 405/15 |
| 2,301,592 | 11/1942 | Teuber | 405/16 |
| 3,374,635 | 3/1968 | Crandall | 405/18 |
| 4,420,275 | 12/1983 | Ruse | 405/15 X |

FOREIGN PATENT DOCUMENTS 2062477 7/1971 Fed. Rep. of Germany ........ 405/16

Primary Examiner—Dennis L. Taylor
Attorney, Agent, or Firm—Charles R. Engle

[57] ABSTRACT

A backshore sill beach and dune erosion control system including a supporting apron of a permeable fabric spread across a shoreline area of beach and dune being protected and held in place by a toe scour protection tube and further including a plurality of sand-filled geotextile containers which are placed upon the supporting apron in an end to end relationship along the shoreline providing a predesigned soft force absorbative horizontal surface decreasing water velocity upon impact therewith.

9 Claims, 9 Drawing Figures

BACKSHORE SILL BEACH AND DUNE EROSION CONTROL SYSTEM

BACKGROUND OF THE INVENTION

1. Field of the Invention

The present invention relates to a beach erosion control structure capable of preventing normally occurring erosion at the base of a sand cliff or dune. More particularly, the present invention relates to a erosion toe scour protection system incorporating a sand-filled geotextile container structure positioned to dissipate wave action prior to impacting the toe area of the dune or cliff where erosion is intended to be prevented.

2. Description of the Prior Art

Conventional attempts to regulate and prohibit beach erosion usually involve installation of wood, steel or concrete walls, installation of a plurality of piles in close contact to form a wall, or the positioning of large rocks or boulders upon the surface to be protected forming what is known as a "hard" revetment. These types of structures have several disadvantages in that after a period of time the desired result is not obtained. Eventually, high seas and storm weather conditions will simply result in a test of whether the wall or rocks are capable of providing a sufficient resistive force to dissipate wave action. In fact, after a period of time, the storm forces usually prevail and the walls are disloged or the rocks are moved about on the beach surface interfering with recreational use and aesthetic appearances of the beach as well as failing to prevent erosion in a particular beach area. A particular disadvantage of a rigid wall is that after continual toe scour erosion, the sand upon which the wall rests and sand areas around the ends of the wall are removed such that the wall is effectively undermined and collapses upon the beach. A significant disadvantage of a hard revetment surface is that the the reflected wave action contributes to the loss of the recreational beach and the water is directed around the ends of the area of the hard revetment structure resulting in concentrated and acelerated erosion at the ends of these hard structures such that adjoining properties at each end of a hard revetment are likely to be seriously affected by the installation.

SUMMARY OF THE INVENTION

In view of the foregoing, an object of this invention is the provision of a relatively simple and economically constructed beach and dune erosion control system protecting the toe or base of a sand dune, bluff, or cliff from high frequency, flow magnitude storm events, such as the annually recurring winter storm events.

Another object of this invention is the provision of a back shore sill beach and dune erosion control system, including a combination of devices which are designed to present a soft wave dissipating shore parallel horizontal surface.

A further object of this invention is the provision of a back shore sill beach and dune erosion control system that does not interfere with the original natural aesthetic appearance of a beach and dune area.

Yet another object of this invention is the provision of a back shore sill beach and dune erosion control system that does not interfere with use of a majority of the recreational beach, although the system may be exposed as a result of being subjected to unusual high water or wave conditions and has not yet had sufficient time to be effective to again cause sand to cover the system by aiding natural sand accretion.

A still further object of the invention is the provision of a back shore sill beach and dune erosion control system incorporating design features effective to result in the natural passive restoration of sand in certain eroded areas subsequent to severe weather conditions.

Yet another object of the invention is a back shore sill beach and dune erosion control system utilizing sand from the beach area to be protected for purposes of maintaining the beach in its original condition.

Another object of the subject invention is provision of means associated with a back shore sill beach and dune erosion control system for retaining the system in place during severe weather conditions.

Yet another object of the invention is provision of large sand filled geotextile containers placed near the back shore area fronting a sand dune, cliff, escarpment or bluff in a form of a shore parallel sill functioning as a wave tripping device by tripping incoming waves which reach the structure.

Additional objects and advantages of the invention will be set forth in part in the description which follows, and in part will be obvious from the description, or may be learned by practice of the invention. The objects and advantages of the invention may be realized and obtained by means of the instrumentalities in combinations particularly pointed out in the appended claims.

The foregoing objects of the invention have been achieved by the provision of a back shore sill beach and dune erosion control system, including a toe scour protection apron formed of a weather and water resistent filter cloth and also having a predetermined permeability. The apron is placed upon the beach surfaces to provide a flat base portion and includes an angularly sloped portion which extends seaward of the base portion. A toe scour protection anchor tube is connected to the seaward edge of the sloped portion of the apron and is filled with sand providing an anchor for the protective apron. A plurality of large sand-filled geotextile containers are placed upon the apron base portion in a manner forming a shore parallel sill which trips incoming waves reaching the structure.

The accompanying drawings, which are incorporated in and constitute a part of the specification, illustrate one embodiment of the invention and, together with the description, serve to explain the principles of the invention.

DESCRIPTION OF THE PREFERRED EMBODIMENT

Reference will now be made in detail to the present preferred embodiment of the invention, and example of which is illustrated in the accompanying drawings.

Figure 1:
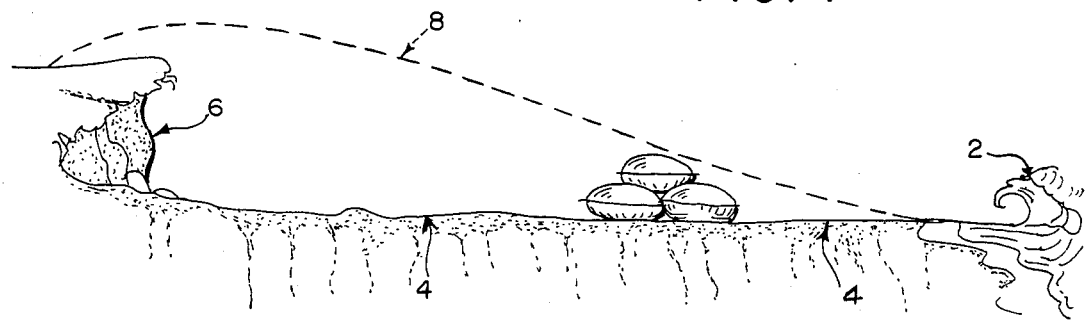
FIG. 1 is a side elevational view illustrating one form of the back shore sill system of my invention.

With reference now to FIG. 1, an ocean surf 2 is shown approaching a beach surface 4 which includes a dune or cliff surface 6 which is illustrated in comparison with the original terrain 8 prior to erosion thereof.

Figure 2:
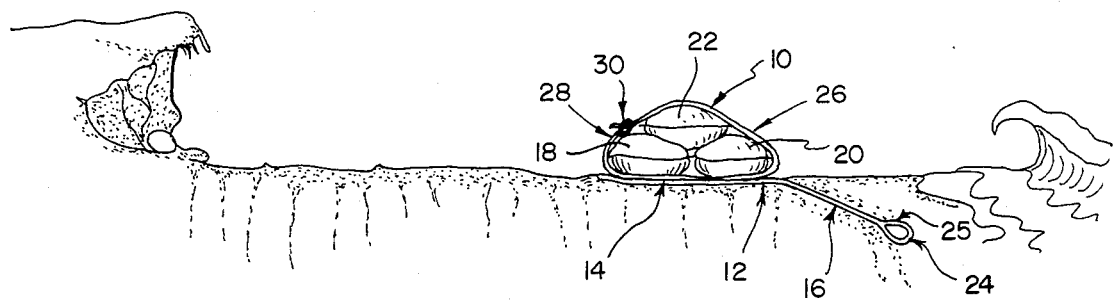
FIG. 2 is a side elevational view illustrating an embodiment of my back shore sill system incorporating a circumfererntial strap restraint system complete with a filter cloth foundation, protective apron, and toe scour protection tube.

With reference now to FIG. 2, in accordance with the invention a back shore sill beach and dune erosion control system 10 includes supporting apron 12 which in turn has a flat base portion 14 and an angularly sloped portion 16 extending seaward as illustrated. The back shore sill erosion control system further includes a plurality of sand filled geotextile containers 18, 20 and 22 which are placed upon apron base portion 14. The sand-filled containers 18, 20 and 22 are formed of a geotextile material that is weather and water resistent and has a predetermined permeability for a purpose to be later discussed. The sand-filled geotextile containers 18, 20 and 22 are relatively large in size and in preferred form may be approximately 20 feet in length and include a weight of approximately 7 tons when filled with sand. As illustrated, the scour protection apron sloped portion 16 is integral with or connected to a sand-filled toe scour protection anchor tube 24, which is covered with sand when installed.

The back shore sill beach and dune erosion control system 10 is shown as further including a circumferential strap restraint system 26 including a strap 28 secured at 30 for tightly holding the sand-filled geotextile containers 18, 20 and 22 in close association to one another and preferably, in the stacked relationship as shown. The strap 28 can be of any desired predetermined width and tensile strength sufficient to hold the containers 18, 20 and 22 in a desired configuration. The only limitation upon materials used to construct strap 28 would be that it is required to have characteristics sufficient to provide desirable resistance to weather and water conditions along with an ability to withstand sand abrasion in the installed position.

Figure 3:
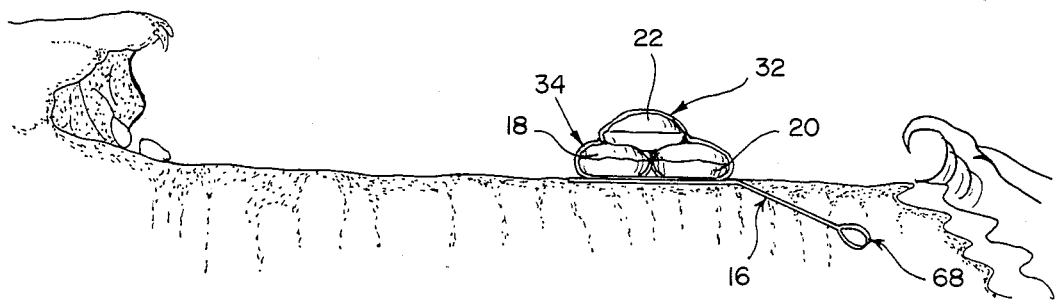
FIG. 3 is a side elevational view of my back shore sill erosion control system incorporating a modified form of the strap restraint system illustrated in FIG. 2.
Figure 8:
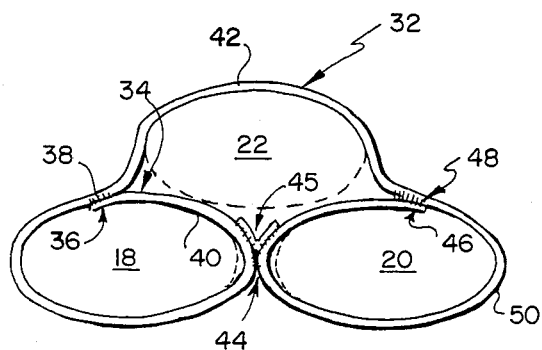
FIG. 8 is an end view of the form of my triple-loop restraint system shown in FIG. 5.

A modified form of my invention is illustrated in FIG. 3. In this form the sand-filled geotextile containers 18, 20 and 22 are retained in position by a strap restraint system 32 formed of a single strap 34, but is configured such that each container is individually restrained relative to the other. As is best illustrated in FIG. 8, strap 34 has a first end 36 which is secured to the strap at portion 38 forming a first loop 40, the strap then continues upwardly over sand bag 22 forming a second loop 42 and continues downwardly and around into contact with first loop 40 at 44 where eventually terminal end 46 is secured to strap portion 48 and forms a third loop 50. It can be readily appreciated that the respective loops 40, 50 and 42 each receive sand-filled containers 18, 20 and 22 as illustrated in FIG. 3. The strap 34 and it's formation of loops 40, 50, and 42 will be described in more detail later.

Figure 4:
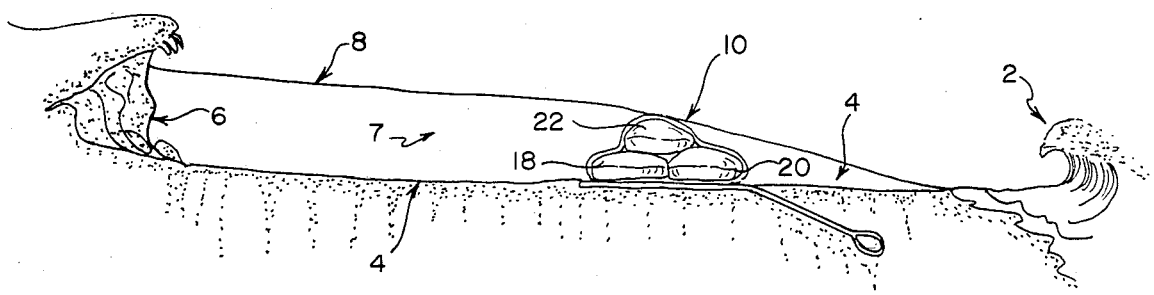
FIG. 4 is a side elevational view of my back shore sill beach and dune erosion control system, illustrating occurrence of natural sand accrertion around the sill.
Figure 5:
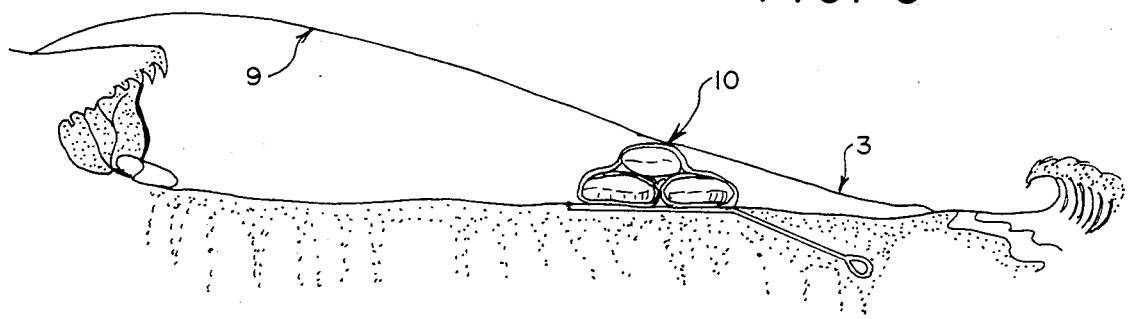
FIG. 5 is a side elevational view of an improved triple-loop form of the strap restraint system, which is a component of my invention.

FIGS. 4 and 5 illustrate changes in terrain 8 as natural sand accretion occurs around the backshore sill beach and dune erosion control system 10. The backshore sill system 10 is completely covered with sand and the terrain is eventually substantially restored to its original configuration.

Figure 6:
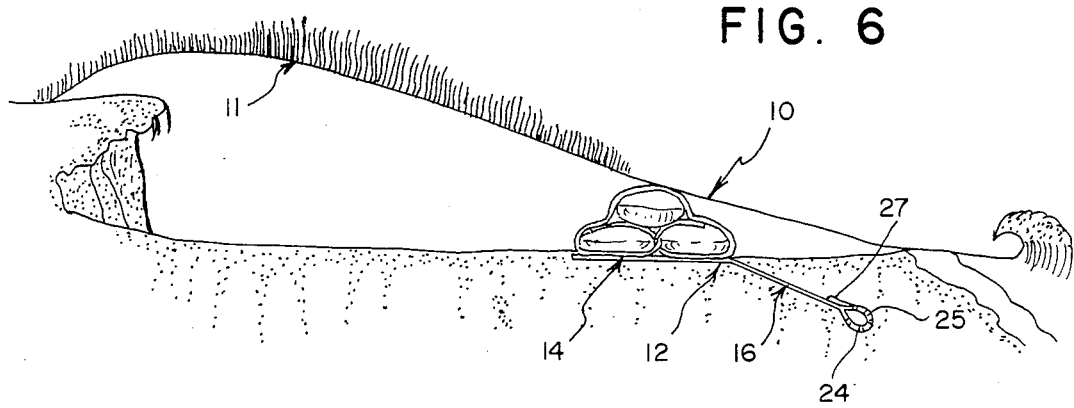
FIG. 6 is a side elevational view illustrating a further improved form of the triple-loop restraint system in combination with a preferred form of a toe scouring anchor tube retaining the supporting apron in place.

FIG. 6 discloses a preferred form of the toe scour anchor tube 24 used to hold the supporting apron in place. As illustrated, the toe scour anchor tube 24 is formed by folding over edge portion 25 and securing it to sloped apron portion 16 at connection 27. The connection 27 can be accomplished by sewing the filter cloth together or by use of a suitable commercially available adhesive. An important feature of the connection 27 is that periodic openings are left unsewn or unadhered providing sand filling points along the tube 24. The tube 24, after being filled with sand, anchors the supporting apron 12 in place. Of course the toe scour anchor tube can be formed in various ways, such as by adhering sloped apron portion 16 to a section of polyvinylchloride tube and providing sand filling openings along the length of the tube.

Figure 7:
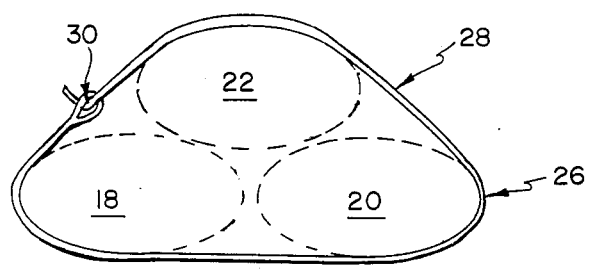
FIG. 7 is an end view of initial version of my strap restraint system.

FIG. 7 shows an early embodiment of the strap restraint system. A single strap 28 is disposed circumferentially about sand-filled geotextile containers 18, 20, and 22, shown in phantom, and is tightly secured together at 30 holding the containers in a stacked relation.

FIG. 8 discloses an improved strap restraint system 32. The sand-filled geotextile containers 18, 20 and 22 are retained in position by the restraint system 32 formed of a single strap 34 which is configured such that each container is individually restrained relative to the other. The strap 34 has a first end 36 which is secured to the at portion 38 forming a first loop 40, the strap then continues upwardly over container 22 forming a second loop 42 and continues downwardly and around into contact with first loop 40 at 44 where eventually terminal end 46 is secured to strap 34 at portion 48 forming a third loop 50. It can be readily appreciated that the respective loops 40, 50 and 42 each respectively receive sand-filled containers 18, 20 and 22 for retaining them in position. Strap junctions 36–38, 46–48 and 44 are sewn securely together. A reinforcing piece of doubled strap 45, or the like, can be sewn into the junction 44, as shown, to strenghen the connection.

Figure 9:
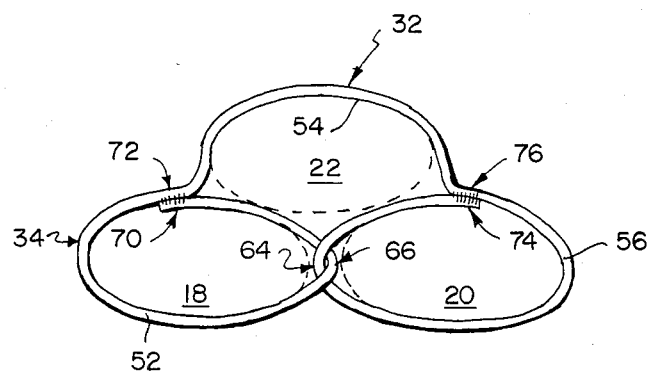
FIG. 9 is an end view of the further improved form of the triple-loop restraint system shown in FIG. 6.

FIG. 9 illustrates a further modified form of the strap restraint system 32. In this particular configuration strap 34 is wrapped to form a first loop 52 by virtue of fastening end 70 at strap portion 72. The strap continues upwardly and downwardly to form a second loop 54 and is formed such that end 74 is passed through loop 52 and secured at strap portion 76 forming loop 56 as illustrated. It is significant that the end 74 is passed through loop 52 providing a connection therebetween without having to permanently and rigidly secure the loop ends 64 and 66 together with a sewn joint required to hold the respective bags 18 and 20 in their desired positions. Obviously, these portions 64 and 66 and strap 34 can be tacked or sewn very lightly together to position the loops relative to one another, but the joint is not required to be of sufficient strength to maintain the the bags 18 and 20 in place.

In operation, during rough water or severe weather conditions the waves 2 roll up beach surface 4 and engage the back shore sill beach and dune erosion control system 10. The impact to the waves 2 upon the surfaces of the back shore sill 10 result in a major force of the wave action being absorbed and dissipated and causing the overtopping waves to lose strength and substantially decrease in velocity prior to reaching the cliff or dune surface 6 that is being protected by the installation. The decrease in velocity of the water after impact with the back shore sill 10 results in some of the landward water borne sand particles 7, FIG. 4, being deposited out as the water drains back toward the surf. The predesigned permeability of fabric used to manufacutre the geotextile containers in combination with the sand within the containers 18, 20 and 22 results in a soft force absorbative horizontal surface preventing the harsh reflective resistance that is provided by hard revetment structures in like circumstances. Consequently, water can drain through the entire back shore sill structure while sand particles 7 are filtered out on the landward side of the sill so that eventually the beach area or surface 4 can be restored by natural accretion and eventually approach the partially renourished elevated height 8 as illustrated in Figure 4.

With reference to FIGS. 5 and 6, the optimum slope and dune elevation may be regained by either scraping of the foreshore area of the beach, dredging fill from offshore or hauling in offsite compatible and fill. The natural accretion occuring behind the sill will substantially reduce dune restoration costs. Aesthetically pleasing vegetation 11, tending to stabilize the restored dune, can be placed upon the dune as illustrated in FIG. 6.

It will be apparent to those skilled in the art that various modifications can be made in the back shore sill beach and dune erosion control system of the present invention without departing from the scope or spirit from the invention. Thus, it is intended that the present invention cover the modifications and variations of this invention provided they come within the scope of the appended claims and their equivalents.

What is claimed is:

1. A backshore sill beach and dune erosion control system comprising: a supporting protective apron formed of weather and water resistant cloth, said apron including a flat base portion and an angularly sloped portion extending seaward of said base portion, a toe scour anchor tube connected to the seaward end of said apron sloped portion, and a plurality of longitudinal sand-filled geotextile containers placed upon said apron base portion each extending longitudinally shore parallel to the incoming surf, said sand-filled geotextile containers being specifically placed upon the beach in a pyramidal longitudinally extending shore parallel relation to an area being protected whereby wave action impacts upon relatively soft surfaces of said containers and is dissipated before normally impacting surfaces that would otherwise be eroded.

2. A backshore sill beach and dune erosion system as described in claim 1 wherein said toe scour anchor tube is formed by a loop secured in the end of the sloped portion of said supporting apron and is filled with sand.

3. A backshore sill beach and dune erosion control system as described in claim 1 wherein the plurality of longitudinal sand-filled geotextile containers comprises three containers in a stacked pyramid relationship.

4. A backshore sill beach and dune control system as described in claim 3 wherein said sand-filled geotextile containers are approximately 20 feet in length, each comprising a weight of approximately 7 tons of containerized sand.

5. A backshore sill beach and dune erosion control system as described in claim 1 further comprising a strap restraint system encircling said plurality of longitudinally disposed sand-filled geotextile containers for retaining them in a position substantially parallel to the incoming surf.

6. A backshore sill beach and dune erosion control system as described in claim 1 wherein the material forming said plurality of sand-filled geotextile containers is of a predetermined strength and permeability providing desired characteristics to resist specific wave force design levels and permit flow of sea water there through facilitating natural accretion of sand particles landward of said sill structure.

7. A backshore sill beach and dune erosion control system as described in claim 2 wherein said anchor tube loop is formed by doubling the apron sloped portion back over itself and sewn at specified contact areas providing unsewn sand filling points in the tube.

8. A backshore sill beach and dune erosion control system as described in claim 5 wherein said strap restraint system comprises a plurality of single loops around said sand-filled geotextile containers at predetermined spaced intervals along the longitudinal length of said containers.

9. A backshore sill beach and dune erosion control system as described in claim 5 wherein said strap restraint system comprises a plurality of single straps each formed in three loops, each loop of each strap encircling a separate sand-filled geotextile container, said single straps being positioned in spaced relation along the longitudinal length of said containers.

* * * * *